United States Patent [19]

Cavalleri et al.

[11] 4,348,764

[45] Sep. 7, 1982

[54] NOZZLE CONSTRUCTION FOR CHEMICAL LASER

[75] Inventors: Robert J. Cavalleri, Cocoa Beach, Fla.; Lamar F. Moon, Agoura; John F. Hon, Tarzana, both of Calif.

[73] Assignee: Rockwell International Corporation, El Segundo, Calif.

[21] Appl. No.: 94,522

[22] Filed: Nov. 15, 1979

[51] Int. Cl.$^3$ .............................................. H01S 3/02
[52] U.S. Cl. ....................................... 372/58; 372/89
[58] Field of Search .................... 331/94.5 G, 94.5 C, 331/94.5 D; 239/552, 553.5, 565

[56] References Cited

U.S. PATENT DOCUMENTS 3,982,208  9/1976  Camac ........................... 331/94.5 G Primary Examiner—William L. Sikes
Assistant Examiner—Léon Scott, Jr.
Attorney, Agent, or Firm—H. Fredrick Hamann; Harry B. Field

[57] ABSTRACT

A primary nozzle provides a two-dimensionally expanding source flow of an oxidizer; a line serving as origin; and curved secondary nozzles are positioned in the primary, supersonic flow, for discharging fuel in radial direction, parallel to the oxidizer flow, mixing therewith in the laser cavity. The secondary nozzles have concavely curved, leading edges as well as concavely curved expansion edges downstream from the leading edges, positioned to cancel shockwaves from the leading edges of the respective adjacent secondary nozzles. The secondary nozzle structure provides a radially expanding fuel flow and maintains the radially expanding primary flows shock free. This radially expanding, primary flow accommodates the unused heat of reaction so that pressure is maintained nearly constant in the laser cavity. Supersonic expansion provides a low, initial pressure, and the radially expanding flow thereby maintains this pressure low.

11 Claims, 7 Drawing Figures

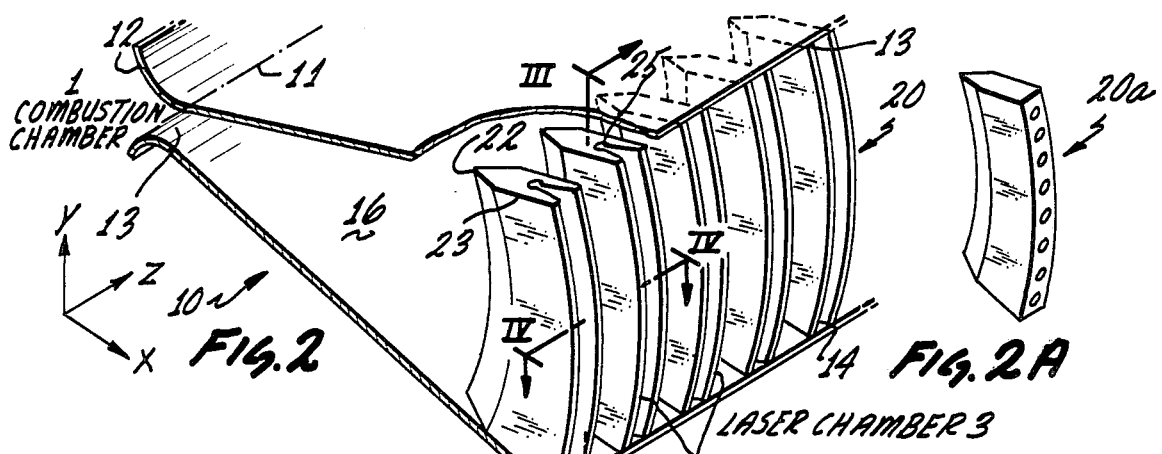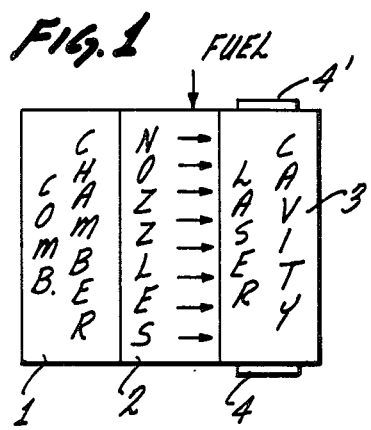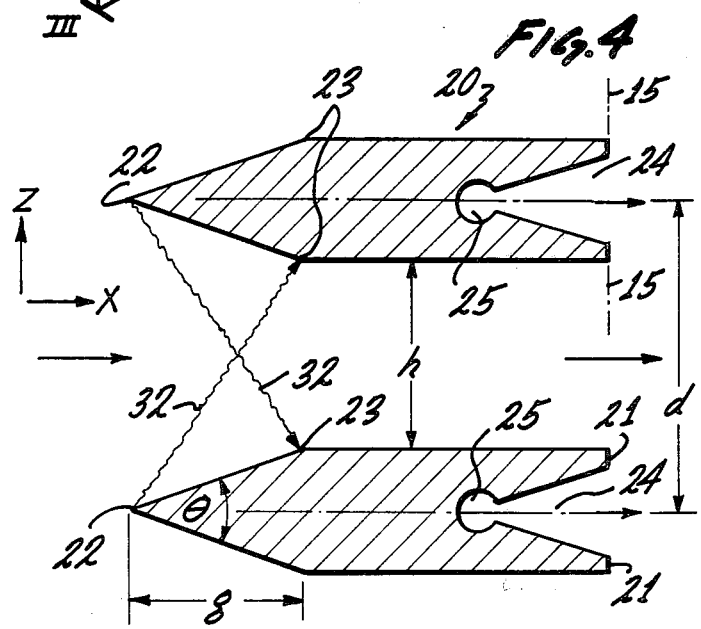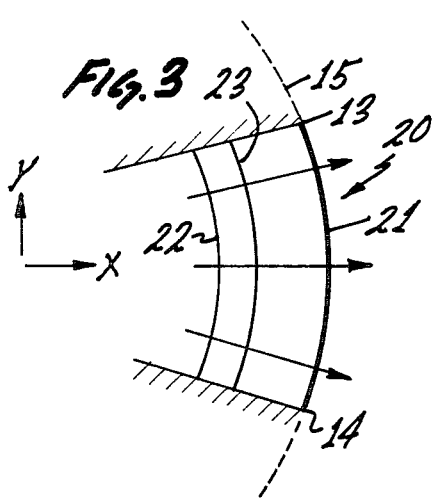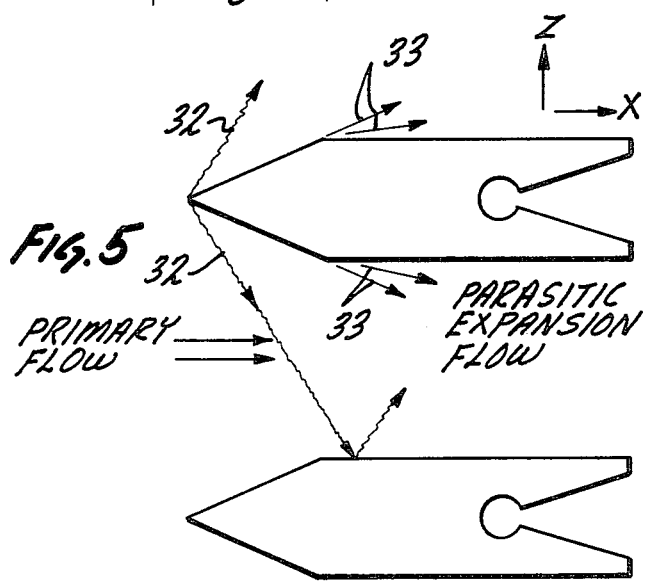

NOZZLE CONSTRUCTION FOR CHEMICAL LASER

BACKGROUND OF THE INVENTION

The present invention relates to a nozzle for a chemical laser and more particularly, the invention relates to a nozzle construction in which, e.g., a fuel and an oxidizer are separately charged into a laser cavity, to be mixed therein under particular thermodynamic conditions to, thereby, become a laser-active medium by a chemical reaction under unique flow conditions that are conducive to very high laser performance.

A typical nozzle construction for a chemical laser consists of a plurality of alternating primary and secondary nozzles, wherein the wall structure, defining and establishing the primary nozzles, includes the secondary nozzles and, possibly, tertiary nozzles for adding diluents. See, for example, U.S. Pat. Nos. 3,688,215, or 3,982,208, or 3,991,384. The primary, slit nozzles are charged with oxidizer gas from a chamber in which that gas is, so to speak, prepared. By way of example, this preparation chamber is a combustion chamber in which heat is developed for dissociating fluorine molecules, or a fluorine compound, into fluorine atoms which will serve as the oxidizer in an HF/DF laser. The primary nozzles cause this oxidizer to be charged into the laser cavity and to expand therein, lowering its temperature and pressure to values required to maintain the requisite population inversion, needed for the laser action, which is produced by chemical reaction.

The secondary nozzles feed fuel, e.g., $H_2$ and/or $D_2$, into the laser cavity, to combine with the atomic fluorine; and the resulting molecules will assume a temporary population distribution under which laser action occurs. It is desirable, or even necessary, for a variety of reasons to charge the laser cavity at supersonic speed. For example, the temperature and pressure in the combustion chamber are very high and one needs a very extensive dynamic cooling and pressure reduction of the oxidizer for obtaining and maintaining lasing conditions of the reaction production. Viscous losses occuring in the nozzle structure should be minimized in order to ensure adequate performance. Thus, thermodynamic and flow-dynamic conditions simply dictate that the gas be accelerated to supersonic Mach numbers for obtaining the requisite drop in temperature and pressure. On the other hand, adequate pressure recovery is needed and supersonic flow provides the driving force for pressure recovery to permit speedy discharge of used-up laser medium from the laser cavity. Independently therefrom, a high speed of the oxidizer is desired for obtaining a sufficiently large zone in the laser cavity in which the reaction takes place, the zone in which laser action is to take place should be as large as possible, to minimize high-intensity thermal loading of optical components.

It was found that the known nozzle structures generally are deficient as to some or all the requirements outlined above. Specifically, these known structures are difficult to cool and require complex construction features to provide aerodynamic or diluent cooling, or both. Furthermore, it was found that prior art nozzles do not necessarily provide consistently supersonic flow speeds. Clearly, there is a need for optimizing the thermodynamic-gas-dynamic conditions under which the oxidizer is fed into the laser chamber under conditions which maximize useful lasing action in that chamber.

Certain prior art nozzles provide for a flow expansion and mixing in the same direction, resulting in mutual dependency of these two processes which, in turn, does not permit optimization of either. The three patents mentioned above are not very specific with regard to the nozzle structure. A somewhat modified nozzle structure is disclosed in U.S. Pat. No. 3,942,363; but only rather general, thermodynamic, and flow-dynamic conditions are derivable from this patent.

Gas dynamic lasers do also employ a nozzle structure for mixing gases; but since the combined flow fields do not serve as a zone or region for a chemical reaction, one can derive little from nozzle structures such as those disclosed, e.g., in U.S. Pat. No. 3,891,944 or 4,056,789.

DESCRIPTION OF THE INVENTION

It is an object of the present invention to provide a new and improved nozzle structure for a chemical laser.

It is another object of the present invention to improve the flow dynamics, particularly as affecting the thermodynamic pressure in a cavity of a chemical laser, upon charging the laser cavity with oxidizer and fuel.

It is a particular object of the present invention to provide a new and improved, combined primary and secondary nozzle structure for chemical lasers in which primary nozzle means feed an oxidizer into the optical cavity of a chemical laser, and secondary nozzle means feed a fuel into that cavity.

It is another particular object of the present invention to improve the flow conditions of a primary, supersonic flow field as produced by a nozzle and involving a gas to be combined downstream from the nozzle with another gas, particularly as applied to a chemical laser.

In accordance with the preferred embodiment of the present invention, it is suggested to provide a primary nozzle for generating a supersonic source flow field, e.g., of an oxidizer, for a chemical laser to expand into the laser cavity, and to provide a plurality of secondary nozzles in the curved exit of the primary nozzle, having a curvature matched thereto and having aerodynamically contoured, curved leading edges as far as the oncoming supersonic primary flow is concerned. The secondary nozzles provide, for example, fuel gas to be mixed with the oxidizer.

The primary nozzle has overall configurations resembling a cylinder section. The axial dimension of the cylindrical configuration extends in the direction of the line which constitutes the (theoretical) source line of origin of the expanding primary flow. The secondary nozzles (i) are particularly spaced from each other, in the direction of that source line; (ii) provide a radial flow parallel to the primary flow in the common exit plane; and (iii) they are provided with particular expansion edges to obtain cancellation of shock waves developed at their leading edges.

The nozzle structure for combining fuel and oxidizers for a chemical laser in accordance with the preferred embodiment is easy to cool, particularly due to the extremely low pressure along the secondary nozzle boundaries exposed to the supersonic primary flow. Since the supersonic primary flow is not produced by multiple slit nozzles, viscous losses are greatly reduced. The primary flow field as a whole is an expanding one (source flow) which, in concert with the heat release in the flow, establishes a constant, low pressure in the laser cavity at a drastically reduced temperature for obtaining uniform thermodynamic conditions for the laser operation and a large zone of the laser cavity.

The invention thus provides a nozzle structure for charging a laser cavity in which a single primary expansion nozzle with a cylindrically curved exit plane is combined with secondary nozzles. These secondary nozzles do not establish slit nozzles; in other words, adjacent bodies for the secondary nozzles are not configured on their outside to establish the primary nozzles. Rather, the outside contour of the bodies containing the secondary nozzles, is configured and these bodies are spaced in order to obtain a shockless, primary flow which expands two-dimensionally only and leaves the nozzle structure in a uniform, cylindrical-radial source flow field, to combine with the secondary (fuel) flow through mixing in the direction transverse to the source flow of the primary and secondary flow expansions.

The inventive concept of a single, source-flow-type primary nozzle, combined with plural, curved secondary nozzles, can be realized over a wide range of physical dimensions. However, it is of advantage to construct an aerodynamic and structurally optimized unit and to combine such units into larger ones for upscaling and larger throughput. The units, each one comprised of a primary nozzle with multiple secondary nozzles, as described, can be assembled in a direction transversely to the source line, all feeding fuel and oxidizer in the same average direction.

DESCRIPTION OF THE DRAWINGS

While the specification concludes with claims, particularly pointing out and distinctly claiming the subject matter which is regarded as the invention, it is believed that the invention, the objects, features, and advantages thereof will be better understood from the following description taken in connection with the accompanying drawings in which:

FIG. 1 is a schematic overview of a chemical laser whose nozzle structure is improved in accordance with the present invention;

FIG. 2 is a schematic perspective view of a nozzle structure in accordance with the preferred embodiment of the present invention;

FIG. 2a is a perspective view of a modified detail of the nozzle structure of FIG. 2;

FIG. 3 is a side elevation and section taken in a plane identified by lines III—III in FIG. 2;

FIG. 4 is a cross section taken in the plane identified by lines IV—IV in FIG. 2;

FIG. 5 is a schematic view modification of one of the elements as shown in FIG. 4, but demonstrating an undesirable contour and combination of parameters.

Figure 6:
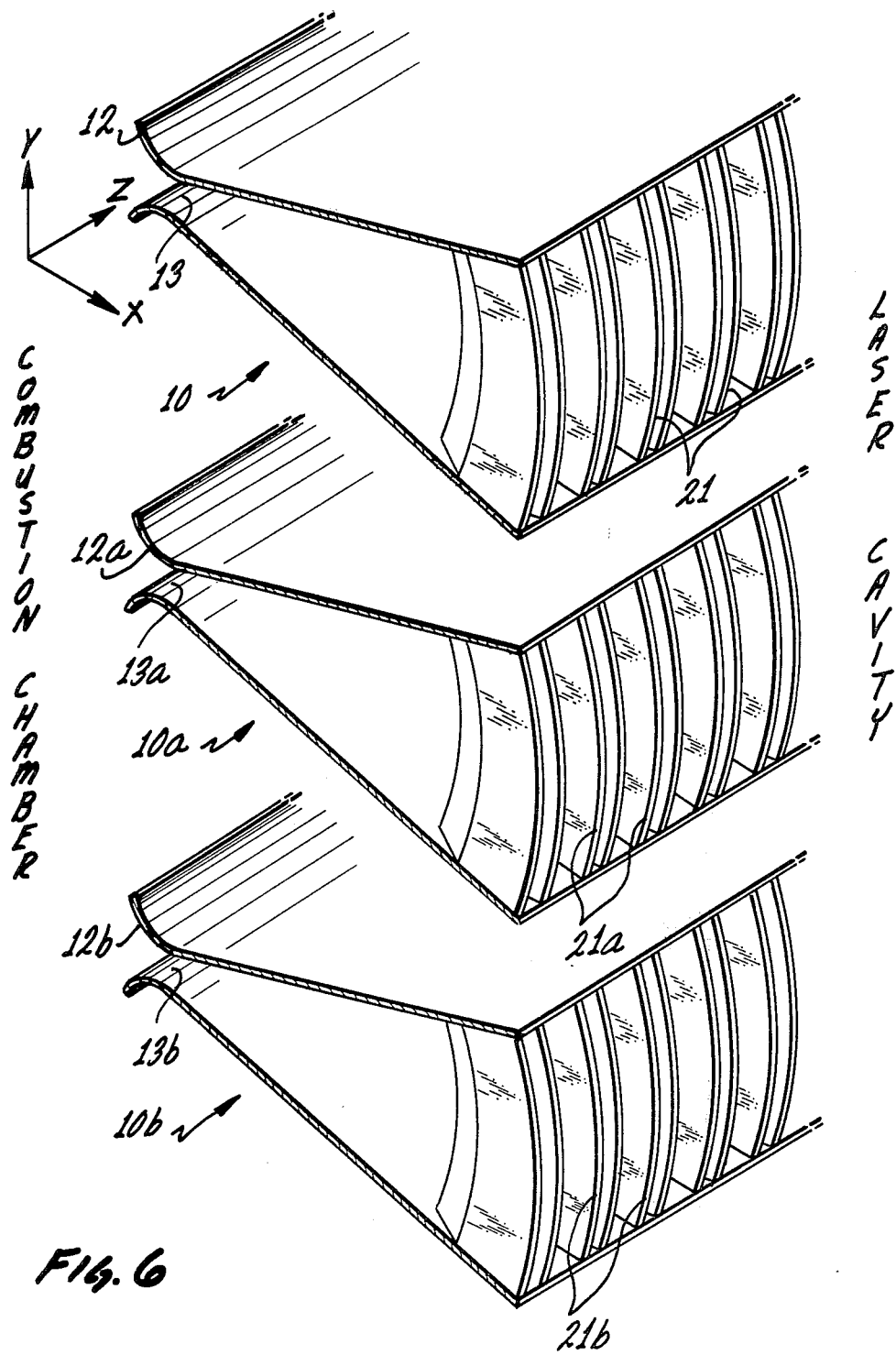
FIG. 6 is a perspective view of a larger nozzle system composed of units of the type shown in FIG. 2.

Proceeding now to the detailed description of the best mode of practicing the invention, reference is made to the drawings, and here particularly to FIG. 1 which illustrates a general layout shown herein only for the purpose of orientation. By way of example, reference numeral 1 refers to a combustion chamber in which the oxidizer is prepared and generated. Fluorine or a fluorine compound is dissociated into fluorine atoms by means of a combustion process, resulting also in the generation of a high pressure. The pressurized gas, including the oxidizer (i.e., atomic fluorine), is charged by means of and through a nozzle structure 2 into a chamber 3. Chamber 3 is or includes the laser cavity, and the particular optical cavity may be bounded by reflectors such as 4 and 4', one of which being also the optical laser beam output coupler.

The portion of nozzle structure 2 providing the oxidizer flow is also called, the primary nozzle. In addition, nozzle structure 2 includes secondary nozzles for charging fuel gas such as $H_2$ or $D_2$ into the laser cavity. Thus, fuel gas must mix with the oxidizer immediately upon entry into the laser cavity to obtain the requisite stoichiometry for the chemical reaction resulting in the laser medium proper. The invention relates in particular to nozzle structure 2.

Proceeding now to FIG. 2, a single primary nozzle 10 provides an expanding flow, originating (theoretically) in a source line 11 on account of the diverging contour of the nozzle. Nozzle 10 is of overall cylindrical construction, the axial dimension of such cylindrical configuration extends along and in the direction of line 11. The figure shows also a three-dimensional coordinate system (X, Y, Z), and source line 11 extends in the Z-direction. The average nozzle flow runs in the X-direction, and the flow is expanded (divergence of the nozzle) in the X-Y planes.

The mouth, or entrance opening, 12 of nozzle 10 faces combustion chamber 1, and expansion portion 16 of the nozzle discharges into laser cavity 3, as stated earlier. The flow of the oxidizer in nozzle 10 is supersonic downstream from throat 13 and remains supersonic up to the entrance into laser chamber 3 and beyond. The nozzle exit is constructed to follow a circularly, cylindrically curved surface 15 (see FIG. 3). This surface is defined in a twofold manner.

First of all, cylindrical surface 15 extends from the one edge 13 of the primary nozzle wall structure to the opposite edge 14 thereof and is defined by the rule that the flow vectors for the primary oxidizer flow are normal on that cylindrical surface. In addition, and quite independently therefrom, but commensurate therewith, surface 15 delineates and coincides with front surfaces 21 of a plurality of curved, secondary nozzles 20. The secondary nozzles are mounted to the walls of the primary nozzle and extend between edges 13 and 14 and edge-near wall portions, accordingly. Each one of the secondary nozzles 20 includes a manifold duct 25 and a slit nozzle opening 24 for the discharge of fuel into laser cavity 3. The modified secondary nozzle 20a, as per FIG. 2A, shows individual holes instead of a slit.

The bodies of secondary nozzles 20 are disposed in the expanding supersonic primary flow field; these nozzle bodies themselves, i.e., the contour of their outside wall surfaces, do not produce the supersonic flow field, nor are their rear edges 22, being leading edges as regards the oncoming primary flow, disposed in or subjected to any subsonic flow. As a consequence, the pressure on the outside surfaces of the secondary nozzle bodies is extremely low, so that the cooling requirements for these nozzles 20 are greatly reduced.

The primary flow field adjacent to and around the secondary nozzles should be considered in greater detail and in conjunction with contour particulars of individual, secondary nozzles 20. The edge 22 of each nozzle 20 is concavely curved in the X-Y plane and faces the oncoming, radial, primary flow field, being normal to the edge on account of the curvature. Edges 22, therefore, delineate a line of constant (dynamic and static) pressure of and in that flow field.

Adjacent ones of secondary nozzles 20, as shown in FIG. 4, define a converging duct for the primary flow leading into a duct portion of constant width h. The nozzles themselves are spaced (in the Z-direction) by the center-to-center distance d. Spacing between respective two nozzles is primarily determined by the fact that, not too far from exit plane 15–21, fuel and oxidizer must have intimately mixed. Thus, one has to observe a maximum spacing which is not to be exceeded to obtain mixture of fuel and oxidizer, rather close to that exit plane. On the other hand, too close a spacing of nozzle bodies 20 necessitates too many secondary nozzles which, again, is to be avoided because each such secondary nozzle does constitute an obstacle in the primary flow field and increases the overall flow resistance against the primary flow.

It can thus be seen that the primary flow field is a source flow, originating (theoretically) in a source line 11 along the Z-direction and expanding predominantly in any X-Y plane in, and downstream from the exit plane. The result of the expansion is a uniform, radial flow field traversing the curved exit plane 15–21. The primary flow, as leaving that curved plane in a normal direction, will expand in the Z-direction only to the extent that such an expansion is inherent in any freeflowing jet after leaving an orifice. As a consequence, a particular pressure field is built up adjacent to that exit plane 15–21, downstream thereof an in optical chamber 3. On the basis of gas dynamics alone, that pressure would decline with distance (X-direction) from nozzle exit plane 15. However, an exothermic chemical reaction takes place in laser chamber 3 as the oxidizer combines with the fuel. This chemical reaction is more intense farther away from plane 15–21 due to increased mixing of primary and secondary flows. Consequently, the static pressure tends to build up in the X-direction.

It can readily be seen that these two phenomena oppose each other: gas dynamic pressure decrease versus thermostatic pressure increase. Upon choosing the flow parameters properly, these two phenomena can be made to balance, so that, indeed, the pressure is at least approximately constant in the X-direction (and Y-direction) for a considerable distance from the curved nozzle exit plane 15–21. Moreover, this low, near-constant pressure is dynamically maintained as any rise (drop) in pressure on account of a reduced (increased) primary flow speed is offset by a corresponding, or near-corresponding, drop (rise) in reaction temperature in the laser chamber. Consequently, one establishes spatially uniform and dynamically invarient thermodynamic conditions over a considerable zone in the laser cavity. The pressure can, of course, be increased again farther downstream (pressure recovery), permitting ready discharge of the used-up laser medium from the laser cavity.

The bodies of the secondary nozzles are configured to minimize aerodynamic resistance to the primary flow field. It is for this reason that the bodies have a sharp leading edge 22. Moreover, the primary flow field is a source field and the curved edges are oriented to be normal to the local flow vectors. These leading edges 22 are necessarily sources of shock waves 22 (see, e.g., FIG. 5). These shock waves are directed towards the respective, adjacent nozzle bodies and may be reflected thereat, into laser cavity 3.

The bodies of the secondary nozzles are additionally provided with expansion edges 23, defined by the portion where the diverging, tapering nozzle structure merges into a portion of constant width, i.e., where the converging ducts between the secondary nozzle bodies change into ducts of constant width h. Expansion edges 23 are also curved in the respective X-Y plane, concentric to edge 22.

Edges 23 of the secondary nozzle bodies produce an expansion flow field and expansion waves as is known from basic aerodynamics of supersonic flow. Such an expansion field would cause the flow vectors to deviate from the X-direction to assume a component in the Z-direction. This is shown also representatively and generally in FIG. 5 (expansion flow lines 33).

FIG. 4 explains how one can use the expansion edges to cancel the shock waves.

The direction of these shock waves, i.e., particularly the angle of such a shock wave relative to the undistributed flow depends on the angle of the interfering surface which, in turn, is determined by the angle $\theta$ of the apex of edge 22. If this angle and the distance h are correctly chosen, not as in FIG. 5, but as in FIG. 4, the shock waves 32 will redirect the primary flow at the expansion edge 32, so that the flow field remains uniform with no pronounced Z-component, while on the other hand the shock waves are extinguished; shocks do not propagate into the laser cavity.

In conjunction therewith, it is, of course, significant that the leading edges 22 of the secondary nozzles are, in fact concavely curved, so that the edges extend normal to the direction of the expanding, oncoming, primary flow field. The pressure is constant along these edges, so that the shock waves develop uniformly. The same, of course, is true for the expansion edges 23 which are concentric to the leading edges in each instance.

It can thus be seen that FIG. 4 represents, indeed, the situation of an appropriate match of the parameters involved. A shock wave is directed towards the expansion edge of the adjacent element, and an expansion is not produced because the shock wave itself is eliminated at that expansion edge. This condition remains true, even though the flow field involved is a radial one and even though the edges 22 and 23 are curved. Controlling here is, of course, the fact that these edges are concentric, so that, once the parameters are matched, shock waves are cancelled throughout.

Broadly speaking, several parameters are involved here to produce a match (or mismatch) and by means of which the relationship of interest can be expressed differently. Aside from the taper angle $\theta$ and the wall-to-wall distance h, another particular nozzle parameter is the center-to-center distance d between the secondary nozzles, so that the maximum nozzle body thickness is given by the difference, $d-h$. The distance g (radial) establishes the recess of expansion edges 23 from leading edges 22 in the direction of the primary flow. Three out of the four parameters d, h, $\theta$, and g are freely selectible; the fourth one results from the selected ones. Of course, the parameters d and h are selected primarily under consideration of structural stability for the secondary nozzles and of the throughput of fuel and oxidizer. Thus, the angle $\theta$ or the apex height g are primarily available for locating the expansion edges (23) relative to leading edges 22 in order to obtain the desired mutual cancellation of shock waves and expansion in any plane that includes the source line.

The particular unit as described and consisting of a single primary nozzle with multiple secondary nozzles can be constructed for a variety of dimensions. However, it may be advisable to provide for a particularly dimensioned unit on the basis of flow dynamic and structural optimization. For upscaling the throughput, such multiple nozzle units can be assembled, stacking them in the Z-direction. Such a system is shown in FIG. 6. The units 10, 10a, 10b, and others are each constructed as a single unit shown in FIG. 2. The entrances 12, 12a, 12b, etc., all face the combustion chamber. Moreover, all units will feed, on the average, into the X-direction. The flows of each unit expand in the +Y and −Y directions, so that the flows of adjacently positioned units merge.

In summary, the primary flow field runs predominantly in the X-direction, expands two-dimensionally in the X-Y planes, but does not develop any significant lateral component of flow in the Z-direction. Accordingly, the primary source flow is, in fact, very little disturbed by the secondary nozzles. Since the primary flow is not the result of multiple slit nozzles, one can readily provide for a significant throughput. Moreover, there is little heat loss into the secondary nozzles; the low pressure along the boundaries, establishes poor heat transfer conditions. Also, viscous losses are greatly reduced by the use of a single, large oxidizer - primary flow nozzle. The aero-dynamically favorable, supersonic profile of the secondary nozzles reduce viscous and boundary layer losses to a considerable extent. The geometry of these secondary losses avoids shock waves and lateral expansion flow for the reasons described in detail above.

The invention is not limited to the embodiments described above, but all changes and modifications thereof not constituting departures from the spirit and scope of the invention are intended to be included.

We claim:

1. A nozzle construction, particularly for a chemical laser for combining a primary flow of a first gas such as an oxidizer, with a second gas such as a fuel, comprising:
a first nozzle having an entry and an exit for providing a supersonic source flow expanding through said first nozzle in parallel planes at right angles to a line defining the source of the flow, the planes including a direction oriented radially through said first nozzle towards a laser optical cavity; and
a plurality of curved, second nozzles disposed adjacent to the exit of said first nozzle, said second nozzles being curved in said planes and arranged side by side in the direction of said line, said second nozzles being spaced along the direction of said line for the passage of said primary flow between adjacent ones of the second nozzles.

2. The nozzle construction as in claim 1, each of said second nozzles having a curved leading edge facing said primary flow and a concentric exit surface, said exit surface being situated on a curved surface extending normal to the direction of said primary flow adjacent said exit surface.

3. The nozzle construction as in claim 2, said leading edge being defined by two inclined surfaces, there being an expansion edge at each one of said surfaces, each respective adjacent pair of the secondary nozzles being spaced so that any shock developed along the leading edge of either one of said pair of nozzles impinges upon one of the expansion edges of the respective other one of said pair of nozzles in order to prevent expansion and to extinguish shock waves.

4. In a chemical laser, a construction for charging oxidizer and fuel into a laser resonant cavity, the combination comprising:
first means for providing a supersonic expansion flow of oxidizer into the cavity, the flow expanding predominantly in two dimensions; and
a plurality of second nozzle means disposed in the supersonic flow as provided by the first means, each one of said second means providing a radial fuel flow field in planes parallel to the two dimensions.

5. The construction as in claim 4, the first means being a nozzle of overall cylindrical configuration with an axial dimension extending at right angles to said two dimensions and having an entrance, a throat, and an expansion portion; said nozzle establishing a primary flow, a source of origin for such a primary flow extending in a direction of said axial dimension.

6. The construction as in claim 5, the plurality of second means including a plurality of nozzle bodies of aerodynamic configuration with each of said nozzle bodies having a curved leading edge facing said supersonic flow and a curved exit plane.

7. The construction as in claim 6, said nozzle bodies having curved expansion edges positioned to intercept shock waves developed by the leading edge of an adjacent one of the nozzle bodies of said plurality.

8. In a nozzle construction, there being means for providing a supersonic flow field of a first gas, a combination comprising:
a first and second secondary nozzle element, each for discharging a second gas and each having a tapered, leading edge in which the taper merges into a wall parallel to said flow field, the walls of the two nozzles having a distance, so that a shock wave from the leading edge of the first nozzle impinges upon the second nozzle at the respective expansion edge.

9. In a nozzle construction which includes means for providing a radial supersonic flow field for a first gas in relation to a source line upstream from said nozzle, the improvement of a curved secondary nozzle having a curved leading edge facing said flow field in normal directions for emitting a second gas also in a radial flow field to mix the radial flow field of the first gas downstream from the curved secondary nozzle.

10. The improvement as in claim 9 further comprising a plurality of such curved secondary nozzles disposed in said flow field and being of similar construction and positioned along said source lines.

11. The nozzle construction as in claim 8, 9, or 10, and being disposed adjacent to a laser cavity, wherein the first gas is an oxidizer and the second gas is a fuel, the oxidizer and the fuel being fed to the laser cavity for mixing therein.

* * * * *